(12) United States Patent
Fra' et al.

(10) Patent No.: US 10,257,302 B2
(45) Date of Patent: Apr. 9, 2019

(54) METHOD AND COMMUNICATION SYSTEM FOR PROVIDING A CONTEXT-BASED COMMUNICATION SERVICE

(75) Inventors: Cristina Fra', Turin (IT); Massimo Valla, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 379 days.

(21) Appl. No.: 13/001,118

(22) PCT Filed: Jun. 27, 2008

(86) PCT No.: PCT/EP2008/058303
§ 371 (c)(1),
(2), (4) Date: Jan. 25, 2011

(87) PCT Pub. No.: WO2009/155994
PCT Pub. Date: Dec. 30, 2009

(65) Prior Publication Data
US 2011/0119299 A1    May 19, 2011

(51) Int. Cl.
G06F 17/30    (2006.01)
H04L 29/08    (2006.01)
H04M 1/725   (2006.01)

(52) U.S. Cl.
CPC .... H04L 67/2814 (2013.01); H04M 1/72577 (2013.01); H04M 2250/10 (2013.01); H04M 2250/12 (2013.01)

(58) Field of Classification Search
USPC ........................................................ 707/769
See application file for complete search history.

(56) References Cited

U.S. PATENT DOCUMENTS 6,639,975 B1 * 10/2003 O'Neal et al. ........... 379/112.01
8,010,134 B2 * 8/2011 Barnes et al. ............. 455/456.6
(Continued)

FOREIGN PATENT DOCUMENTS

CA    2 431 491 A1    6/2002
EP    1 434 485 A1    6/2004
(Continued)

OTHER PUBLICATIONS

International Search Report from the European Patent Office in International Application No. PCT/EP2008/058303, dated Apr. 14, 2009.

*Primary Examiner* — Syling Yen
*Assistant Examiner* — Bao G Tran
(74) *Attorney, Agent, or Firm* — Finnegan, Henderson, Farabow, Garrett & Dunner, L.L.P.

(57) ABSTRACT

A method for providing a context-based service in a communication network includes: at a context server cooperating with the network, receiving a query generated from a service application, indicating that the service application needs to receive from the context server a set of context information when a query condition is fulfilled; at the context server, generating an update rule indicating that a terminal has to transmit the context information to the context server when an update condition is fulfilled; transmitting the update rule from the context server to the terminal; detecting the context information and transmitting them to the terminal; at the terminal, receiving the context information and transmitting them to the context server when the update condition is fulfilled; and at the context server, forwarding the context information to the service application, thus allowing the service application to implement the context-based service.

14 Claims, 7 Drawing Sheets

(56) References Cited

U.S. PATENT DOCUMENTS

| | | |
|---|---|---|
| 2003/0018692 A1 | 1/2003 | Ebling et al. |
| 2003/0171860 A1* | 9/2003 | Fan et al. .................. 701/33 |
| 2003/0212996 A1* | 11/2003 | Wolzien .................. 725/60 |
| 2005/0003804 A1* | 1/2005 | Huomo ............ G06Q 20/382 |
| | | 455/414.1 |
| 2006/0074633 A1 | 4/2006 | Mahesh et al. |
| 2006/0184616 A1 | 8/2006 | Park et al. |
| 2007/0006098 A1 | 1/2007 | Krumm et al. |
| 2007/0016570 A1* | 1/2007 | Punaganti Venkata ............ |
| | | G06F 17/30864 |
| 2007/0198505 A1* | 8/2007 | Fuller ............ G06F 17/3087 |
| 2008/0126961 A1* | 5/2008 | Naaman ............ G06F 17/3087 |
| | | 715/764 |
| 2008/0183681 A1* | 7/2008 | Messer ............ G06F 17/30796 |
| 2008/0183698 A1* | 7/2008 | Messer ............ G06F 17/30038 |
| 2008/0299959 A1* | 12/2008 | Geyer .................. H04W 4/02 |
| | | 455/418 |
| 2009/0170469 A1* | 7/2009 | Tuli et al. .................. 455/406 |

FOREIGN PATENT DOCUMENTS

| | | |
|---|---|---|
| JP | H5-197892 A | 8/1993 |
| JP | 2003-115093 A | 4/2003 |
| JP | 2007-304825 A | 11/2007 |
| WO | WO 02/093877 A1 | 11/2002 |
| WO | WO 2004/089006 A2 | 10/2004 |
| WO | WO 2006/097778 A1 | 9/2006 |

* cited by examiner

METHOD AND COMMUNICATION SYSTEM FOR PROVIDING A CONTEXT-BASED COMMUNICATION SERVICE

CROSS REFERENCE TO RELATED APPLICATION

This application is a national phase application based on PCT/EP2008/058303, filed Jun. 27, 2008.

TECHNICAL FIELD

The present invention relates to the field of communication services. In particular, the present invention relates to a method for providing a context-based service to a terminal of a communication network. Further, the present invention relates to context server, a terminal and a communication system configured for implementing the above method.

BACKGROUND ART

It is known that communication networks allow to provide users with a number of data services (for instance, Internet access, e-mail, exchange of messages, video-on-demand) and/or telephone services (for instance, calls and conference calls).

A user may access such services by means of a terminal, which can be either a fixed terminal (i.e. a terminal which is connected to the communication network distributing the services through a wired connection) or a mobile terminal (i.e. a terminal which is connected to the communication network distributing the services through a wireless connection). Exemplary mobile terminals are the GSM (Global System for Mobile communications) or UMTS (Universal Mobile Telecommunication System) mobiles and the laptop computers provided with a GSM or UMTS interface, or with a Bluetooth or Wi-Fi interface.

A terminal (in particular, a mobile terminal) is frequently equipped with a number of sensors allowing to detect context information about the terminal. In the following description and in the claims, the expression "context information about a terminal" will designate a set of information indicative of the context (i.e. the environment and/or the operating status) in which the terminal is put. Exemplary context information are:

- the terrestrial coordinates at which the terminal is located, which may be detected by the mobile network (on the basis of measurements done by the terminal or by the network) or which may be detected by a GPS device installed on the terminal, and which allow to determine the location of the terminal;
- the identifier of the mobile cell in which the terminal is located, which may be detected by any GSM or UMTS mobile, and which is indicative of the location of the terminal;
- the luminosity and/or the temperature and/or the humidity of the environment surrounding the terminal, which can be detected by suitable sensors installed on the terminal, and which are indicative of the environment surrounding the terminal (i.e. whether it is an outdoor environment or an indoor environment, etc.);
- the acceleration to which the terminal is subjected, which can be detected by an accelerometer installed on the terminal and which is indicative of whether the user is moving or standing; and
- the presence of other terminals in the environment surrounding the terminal, which can be detected e.g. by a Bluetooth interface or a Wi-Fi interface (in order to be detected, also the other terminals should be equipped with a corresponding interface).

Recently, service providers are able to collect context information from the terminals of their users, and to process them for providing data services and telephone services which are capable of adapting themselves to the context of the terminals. In the following description and in the claims, the expression "context-based service" will designate a data service or a telephone service which is capable of acquiring context information from a terminal and to use such context information for adapting itself to the context of the terminal.

WO 2006/097778 discloses a method for sending environmental data by means of a mobile terminal device, comprising the steps of detecting said environmental data, evaluating said environmental data, determining if said evaluated environmental data is to be sent, and sending said environmental data in case of an affirmative determination. In particular, each mobile terminal device is equipped with a wireless data interface for sending and receiving data packets to and from a service provider. Said service provider is equipped with a data storing module for storing the received data, originating from said plurality of mobile terminal devices. Additionally, each mobile terminal device has a sensor for detecting and preferably recording environmental data. These environmental data may comprise humidity, luminance, temperature, position and the like. Said mobile terminal device records the environmental data and it is adapted to evaluate it. The devices are enabled to decide either the data shall be temporarily stored or sent to said service provider.

US 2007/006098 describes methods that utilize a geographic location technology (e.g., GPS) to determine user location data, and existing network-based websites (e.g., Internet websites) for searching and accessing data related to the location data such that the user context can be developed and stored.

WO 2002/093877 discloses a context sensitive web services method that enables a mobile phone or wireless device to use context inference techniques to sense the user's environment and in response, to provide useful information to the user that is appropriate to the user's perceived environment. The method includes the steps of receiving sensor signals characterizing a current environment of the wireless device; processing the sensor signals with a context inference engine; outputting a current context result from the processing by the context inference engine; and providing useful information to the user in response to the current context result.

WO 2004/089006 discloses a mobile station for managing context-related information including at least one sensor capable of measuring at least a portion of at least one condition of the mobile station. The mobile station also includes a context engine capable of storing context-related information based upon the portion of the condition(s), where the context engine is also capable of managing an exchange of the context-related information with at least one context consumer. The mobile station further includes a privacy engine, a script engine and a communication manager. The privacy engine can provide security and/or privacy to the exchange of the context-related information. The script engine can execute at least one context rule relating to at least a portion of the context-related information. And the communication manager can communicate with at least one context consumer external to the mobile station for the exchange of context-related information WO 2006/106303 discloses a system for processing context data comprising means for receiving context data from a plurality of sources; means for producing context information from the received context data according to a predetermined rule-set including a plurality of rules; and means for communicating the context information to at least one application, wherein the system includes means for permitting at least one protocol-source to specify instructions and/or rules related to a communication protocol for communication between the protocol-source and the system, thereby updating the means for receiving and/or the means for communicating.

US 2006/184616 discloses a method of managing conflicts between context-aware applications by use of semantics of abstract service for group context information management. The method includes detecting and resolving a conflict between context-aware applications; upon receiving a service request from an application, analysing a semantic of the requested service; and registering the semantic into a data structure.

US 2006/074633 discloses a method for improved diagnostic reading and workflow in a healthcare environment using rules-based context management. In an embodiment, the system includes a plurality of information sources, wherein each of the plurality of information sources includes information. The system also includes a rules engine including at least one rule governing at least one of availability and presentation of information.

CA 2431491 discloses an architecture having a centralized storage location coupled to a context manager for servicing and logging context events from a plurality of sources. This type of system uses a synchronization scheme to perform orderly storage and retrieval of data to and from the centralized storage location.

The paper "A Context Query Language for Pervasive Computing Environments" from Roland Reichle et al., Proceedings on 5th IEEE Workshop on Context Modeling and Reasoning (CoMoRea) and 6th IEEE International Conference on Pervasive Computing and Communication (PerCom '08), Hong Kong, 17-21 Mar. 2008, discloses requirements for querying and accessing context information in mobile and pervasive computing environments. Furthermore it studies existing query languages and it is shows that they satisfy only a subset of these requirements or cover some of them only to a limited extend. Therefore, it presents a context query language to overcome these shortcomings. It explicitly addresses heterogeneous representations of context information, definition of complex filtering mechanisms, elaborate aggregation functions and ontology integration, all in one language.

SUMMARY OF THE INVENTION

The Applicant has noticed that the implementation of a context-based service in a communication network typically requires that the communication network cooperates with a context database, which stores context information detected and transmitted by the terminals connected to the communication network. Typically, the terminals constantly update the context information stored at the context database by periodically detecting the context information and transmitting them to the context database.

When the user of a terminal wishes to access a context-based service, a corresponding service application is activated, which retrieves from the context database the context information required for providing the context-based service.

The Applicant has noticed that the above described mechanism for providing a context-based service disadvantageously implies a non efficient use of the terminal's resources, in particular of the terminal's battery and computation capacity.

Indeed, according to the above mechanism, the various terminals periodically detect and transmit the context information to the context database, even if such context information are not specifically requested by any service application. In other words, the terminals disadvantageously employ their resources for periodically detecting and transmitting context information which are stored at the context database, but which possibly will not be requested by any service application.

This also implies a non efficient use of the communication network resources (e.g. routers, etc.), since a part of such resources has to be allocated for transmitting packets transporting the context information from the terminals to the context database, even though such context information have not been requested by any service application.

In view of the above, the Applicant has tackled the problem of providing a method for providing a context-based service to a terminal of a communication network which overcomes the aforesaid drawbacks, i.e. which allows to provide the service application with the context information required for implementing the context-based service, while allowing to use in a more efficient way both the resources of the terminal (in particular, its battery and its computation resources) and the resources of the communication network by minimizing detection and transmission of context information which are not needed for implementing the context-based service.

According to a first aspect, the present invention provides a method for providing a context-based service to a terminal of a communication network, the method comprising:
a) at a context server cooperating with the communication network, receiving a query, generated from a service application, the query indicating that the service application needs to receive from the context server a set of context information when a query condition is fulfilled;
b) at the context server, generating an update rule associated to the query, the update rule indicating that the terminal, for allowing the context server to serve the query, has to transmit the context information to the context server when an update condition is fulfilled;
c) transmitting the update rule from the context server to the terminal;
d) at a sensor module, detecting the context information, and transmitting them to the terminal,
e) at the terminal, receiving the context information and transmitting them to the context server when the update condition is fulfilled; and
f) at the context server, forwarding the context information to the service application, thus allowing the service application to implement the context-based service.

Preferably, step b) further comprises a step of generating a trigger associated to the query, the trigger indicating that the context server, for serving the query, has to forward the context information to the service application when a trigger condition is fulfilled.

Profitably, the step a) comprises determining a query condition type, the query condition type being one of: on-clock query condition type, on-value query condition type and on-change query condition type.

Preferably, step b) comprises inserting in the trigger a trigger condition of a trigger condition type corresponding to the query condition type.

Preferably, step b) comprises checking whether a further update rule including a further update condition and relating to the context information is active and, in the negative, inserting in the update rule an update condition of an update condition type corresponding to the query condition type.

Preferably, step b) comprises checking whether a further update rule including a further update condition and relating to the context information is active and, in the affirmative, if the query condition type is the on-clock query condition type:
- if the further update condition is of on-clock type, inserting in the update rule an update condition Cr=C/max (min(x,y), ts), ts being a minimum period of detection and transmission of the context information at the terminal;
- if the further update condition is of on-value type or of on-change type, inserting in the update rule an update condition, and
- replacing the further update rule with the update rule.

Preferably, e step b) comprises checking whether a further update rule including a further update condition and relating to the context information is active and, in the affirmative, if the query condition type is the on-value query condition type:
- if the further update condition is of on-value type, inserting in the update rule an update condition Cr=V/(p=p* OR r=r*);
- if the further update condition is of on-clock type or of on-change type, inserting in the update rule an update condition Cr=H/; and
- replacing the further update rule with the update rule.

Preferably, step b) comprises checking whether a further update rule including a further update condition and relating to the context information is active and, in the affirmative, if the query condition type is the on-change query condition type:
- if the further update condition is of on-change type, inserting in the update rule an update condition Cr=H/(q OR z);
- if the further update condition is of on-value type or of on-clock type, inserting in the update rule an update condition Cr=H/, and
- replacing the further update rule with the update rule.

According to a second aspect, the present invention provides a context server suitable for cooperating with a communication network for providing a context-based service to a terminal of the communication network, the context server comprising:
- a query pre-processor suitable for receiving a query from a service application, the query indicating that the service application needs to receive from the context server a set of context information relating to the terminal when a query condition is fulfilled; and
- a query processor suitable for:
  - generating an update rule associated to the query, the update rule indicating that the terminal, for allowing the context server to serve the query, has to detect the context information and transmit them to the context server when an update condition is fulfilled; and
  - transmitting the update rule to the terminal;

the context server being suitable for receiving the context information and forwarding it to the service application, thus allowing the service application to implement the context-based service.

Preferably, the query processor is further suitable for generating a trigger associated to the query, the trigger indicating that the context server, for serving the query, has to forward the context information to the service application when a trigger condition is fulfilled, the context server further comprising a trigger database for storing the trigger.

Preferably, the context server further comprises a trigger processor suitable for cooperating with the trigger database for checking whether the trigger condition is fulfilled and forwarding the context information to the service application if the trigger condition is fulfilled.

Preferably, the query processor is further suitable for determining a query condition type, the query condition type being one of: on-clock query condition type, on-value query condition type and on-change query condition type.

According to a third aspect, the present invention provides a terminal for a communication network, the communication network cooperating with a context server suitable for providing a context-based service to the terminal, the terminal being suitable for cooperating with a sensor module configured to detect context information relating to the terminal, the terminal including a context client suitable for:
- receiving from the context server an update rule indicating that the terminal, for allowing the context server to serve the query, has to detect the context information and transmit them to the context server when an update condition is fulfilled; and
- operating the sensor module according to the update rule.

According to a fourth aspect, the present invention provides a communication system suitable for providing a context-based service to a terminal of the communication system, the communication system including a communication network to which the terminal is connected, a service application suitable for implementing the context-based service and a context server suitable for cooperating with the service application and with the communication network, the terminal being and the context server being as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
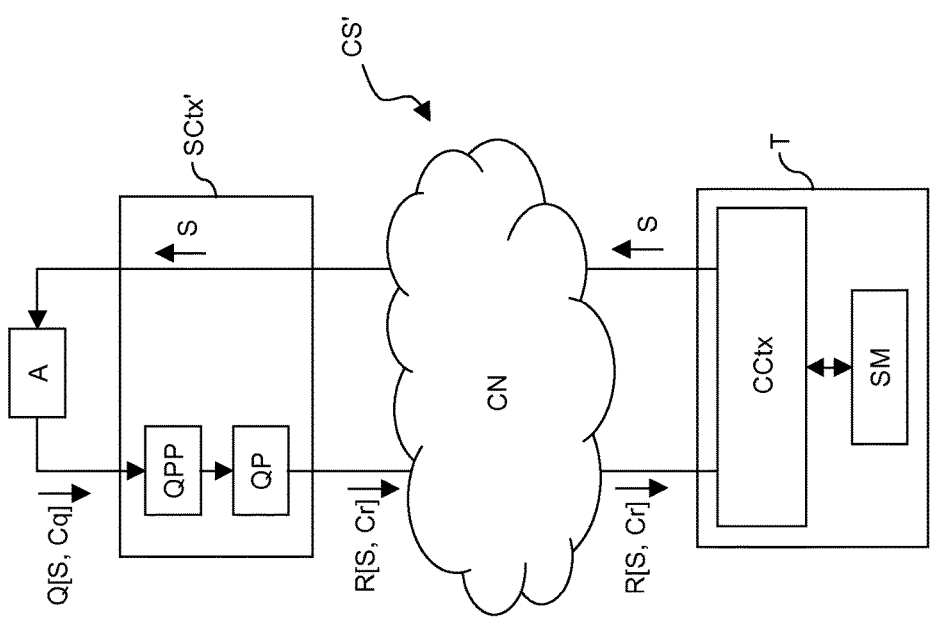
FIG. 1 schematically shows a communication system suitable for implementing the method according to a first embodiment of the present invention.

FIG. 1 schematically shows a communication system CS' according to a first embodiment of the present invention.

The communication system CS' preferably comprises a communication network CN. For instance, the communication network CN may comprise a mobile access network such as a GSM or UMTS network and/or a transport packet-switched network such as an Internet network.

Further, the communication system CS' comprises a context server SCtx' and a service application A. Preferably, the service application A is suitable for implementing (when activated) a context-based service by cooperating with the context server SCtx', as it will be described in further detail herein after. Optionally, the service application A may be included in the context server SCtx'. For instance, it may be a configuration application which is automatically activated at the context server SCtx' when a given event occurs in the communication system CS' (e.g., a new terminal is connected to the communication network CN). Further, preferably, the communication system CS' comprises a terminal T, by means of which a user may access the context-based service implemented by the service application A.

Preferably, the terminal T cooperates with a sensor module SM, which includes one or more sensors suitable for detecting context information relating to the terminal T. In FIG. 1, the sensor module SM is represented as included in the terminal T. However, according to other embodiments not shown in the drawings, the sensor module SM may be external to the terminal T.

Further, preferably, the terminal T comprises a context client CCtx. The context client CCtx is preferably configured to command the sensor module SM and to cooperate with the context server SCtx' through the communication network CN. The context client CCtx may be for instance a client application installed on the terminal T by the terminal manufacturer. Alternatively, the context client CCtx may be downloaded on the terminal T by the service provider, either automatically or at the user's request.

According to the first embodiment of the present invention, the context server SCtx' preferably comprises a query pre-processor QPP and a query processor QP.

Figure 2:
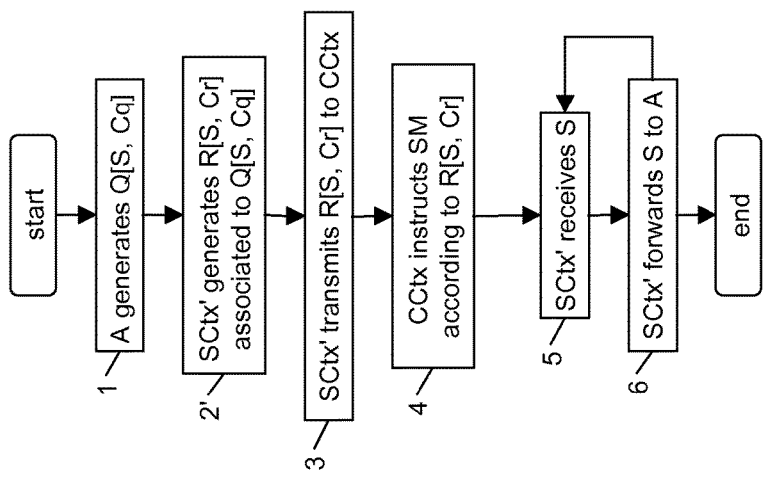
FIG. 2 is a flow chart schematically showing the operation of the communication system of FIG. 1.

Herein after, by referring to FIG. 2, the operation of the communication system CS' will be described in detail, under the assumption that the user of the terminal T requests to access the context-based service implemented by the service application A.

Preferably, when the user requests to access the context-based service, the service application A is activated. Alternatively, the service application A may be activated at the request of the context server SCtx'.

When the service application A is activated, it preferably generates a query Q[S, Cq] (step 1), indicating that the service application A, for correctly implementing the context-based service, needs to receive from the terminal T a set of context information S when a query condition Cq is fulfilled. The context information S may be either the whole context information detected by the sensor module SM, or a part of it. The query Q[S, Cq] preferably also comprises an identifier of the terminal T since, generally speaking, the communication system CS' of FIG. 1 comprises various terminals, and therefore the application A has to specify the terminal to which the query relates. For simplicity, in the following description, the identifier of the terminal T will be omitted.

As it will be discussed in detail herein after, the query condition Cq may be the expiration of a periodical timer, or a condition on a value of a given parameter (e.g. a change of the value of such parameter, or the equality of the value of such a parameter to a predefined value). For instance, the query Q[S, Cq] may specify that the service application A needs to receive the terrestrial coordinates of the terminal T every 5 seconds. Besides, the query Q[S, Cq] may specify that the service application A needs to receive the temperature and humidity of the environment surrounding the terminal T when the terminal T enters a predefined mobile cell.

Preferably, the query Q[S, Cq] is written in XML (Extensible Markup Language, as defined by the W3C in http://www.w3.org/TR/xml The query Q[S, Cq] is received by the context server SCtx', which preferably processes it (by means of its query pre-processor QPP and query processor QP, as it will be described in detail herein after) thus generating an update rule R[S, Cr] associated to the query Q (step 2') and indicating that the terminal T, for allowing the context server SCtx' to correctly serve the query Q[S, Cq], should detect the context information S and transmit them to the context server SCtx' when an update condition Cr is fulfilled.

The update condition Cr depends on the query condition Cq. For instance, if the query Q[S, Cq] indicates that the service application A needs to receive the terrestrial coordinates of the terminal T every 5 seconds, the update rule R[S, Cr] associated to the query Q[S, Cq] preferably indicates that the terminal T should detect and transmit the terrestrial coordinates of the terminal T every 5 seconds. More complex cases may arise when a query Q[S, Cq] comprises more than one query condition, or when multiple queries are generated (possibly by different service applications) on the same context information S. The generation of the update rule R[S, Cr] in such cases will be described in detail herein after.

By referring again to FIG. 2, the context server SCtx' then transmits the update rule R[S, Cr] to the context client CCtx of the terminal T (step 3). Then, the context client CCtx preferably instruct the sensor module SM to operate according to the update rule R[S, Cr] (step 4). In this way, the sensor module SM starts to detect the context information S and to transmit them to the context server SCtx' when the update condition Cr is fulfilled. The context server SCtx' then starts receiving updates of the context information S from the terminal T according to the update rule R[S, Cr] (step 5). Upon reception of each update of the context information S, the context server SCtx' preferably forwards it to the service application A (step 6), which therefore can process it for providing the user of the terminal T with the context-based service. Steps 5 and 6 are preferably repeated until the query Q[S, Cq] (and therefore the update rule R[S, Cr]) is expired.

Therefore, advantageously, according to this first embodiment of the present invention, the resources of the terminal T (in particular, its battery and its computation capacity) are used exclusively for detecting and transmitting the context information S, which have specifically been requested by the service application A in the query Q[S, Cq]. Indeed, thanks to the query-update rule mechanism implemented by the context server SCtx' and the context client CCtx, the terminal T (in particular, its sensor module SM) is instructed to detect and transmit only the context information specified in the query Q[S, Cq]. Moreover, such context information S are detected and transmitted by taking into account the update condition Cr, which is determined according to the query condition Cq. Therefore, the terminal T does not continuously update the context information S, but it updates them only when an update is actually requested by the service application A.

For instance, if the query Q[S, Cq] specifies that the service application A needs to receive context information indicative of the presence of other terminals in the environment surrounding the terminal T when a predefined terminal T' is located in the environment surrounding the terminal T, the terminal T advantageously does not transmit information about the presence of other terminals in the environment surrounding the terminal T, unless it detects the presence of the predefined terminal T'. Therefore, advantageously, the terminal T only periodically checks whether other terminals are located in the environment surrounding the terminal T (e.g. by means of its Bluetooth interface) and, when the context client CCtx detects the presence of the predefined terminal T', it actually transmits the context information indicative the presence of other terminals in the environment surrounding the terminal T to the context server SCtx'.

The above example shows that not only the terminal's resources are exploited in a more efficient way, but also the communication network resources are more efficiently used, since transmission of context information from the context client CCtx to the context server SCtx' is performed only when actually requested. This advantageously reduces the costs of the communication between the terminal T and the communication network CN.

Figure 3:
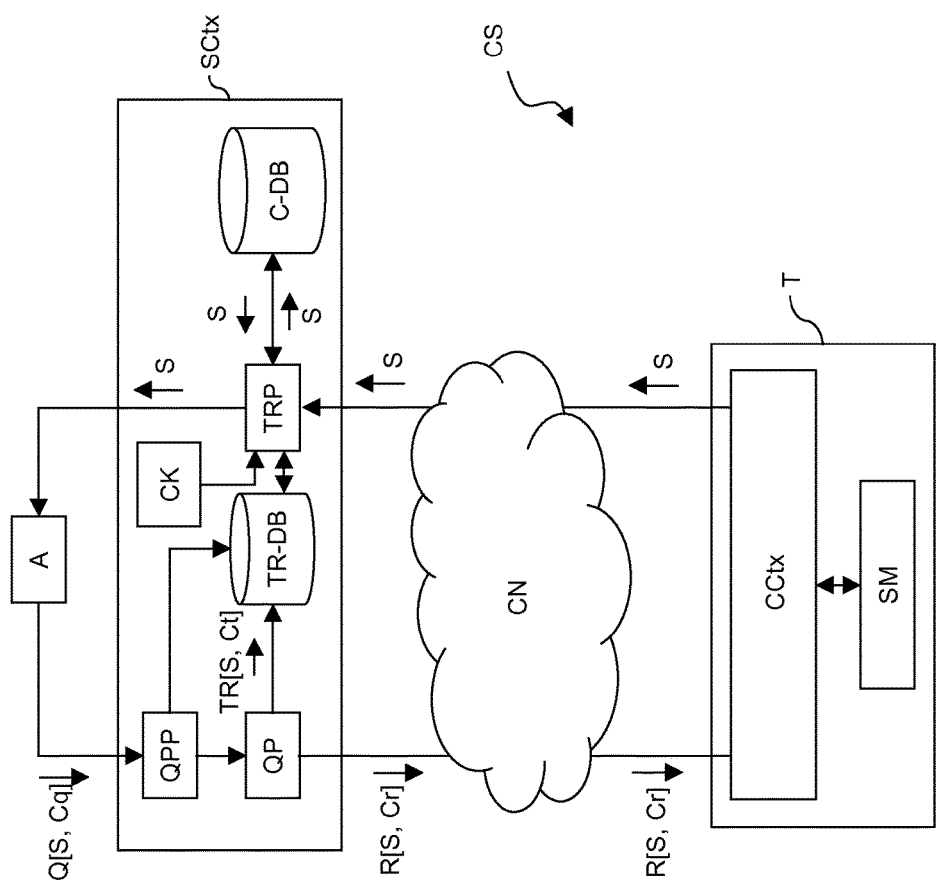
FIG. 3 schematically shows a communication system suitable for implementing the method according to a second embodiment of the present invention.

FIG. 3 schematically shows a communication system CS suitable for implementing the method according to a second embodiment of the present invention.

Similarly to the communication system CS' of FIG. 1, the communication system CS of FIG. 3 comprises a communication network CN, a service application A and a terminal T having a sensor module SM and a context client CCtx. Since such components are substantially identical to the ones of FIG. 1, a detailed description of them will not be repeated.

Further, the communication system CS comprises a context server SCtx, which is suitable for cooperating with the service application A and with the context client CCtx through the communication network CN.

Preferably, according to this second embodiment of the present invention, the context server SCtx comprises a query pre-processor QPP, a query processor QP, a trigger database TR-DB, a trigger processor TRP, a trigger clock CK cooperating with the trigger processor TRP, and a context database C-DB.

Figure 4:
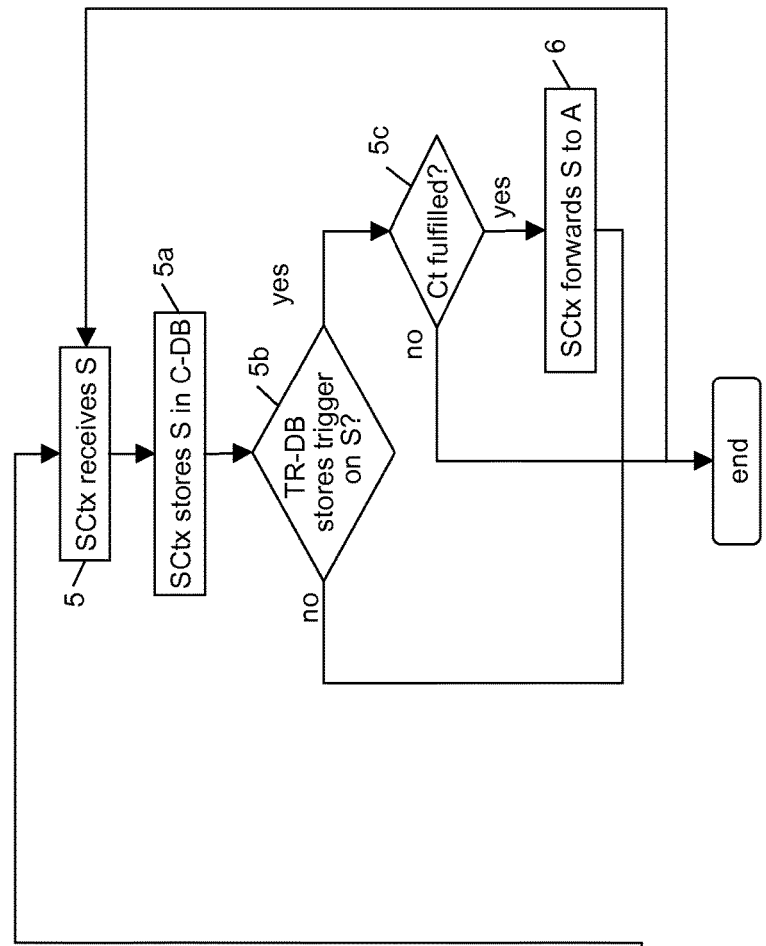
FIG. 4 is a flow chart schematically showing the operation of the communication system of FIG. 3.
Figure 4:
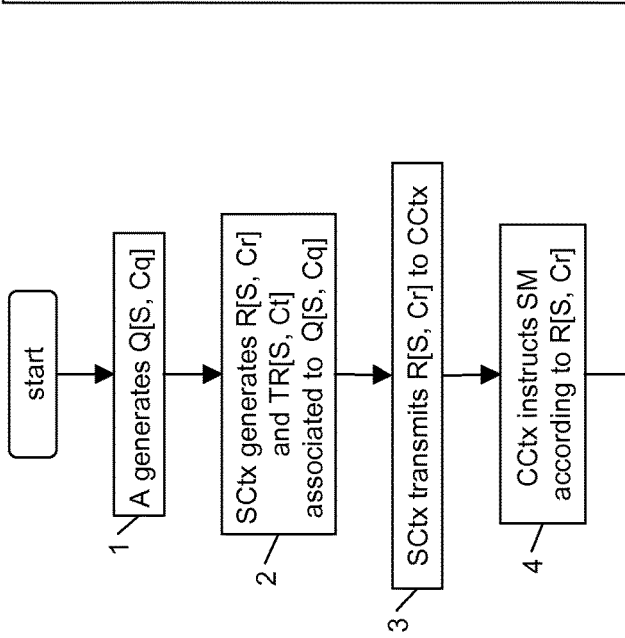

Herein after, by referring to FIG. 4, the operation of the communication system CS will be described in detail, under the assumption that the user of the terminal T requests to access the context-based service implemented by the service application A.

Preferably, when the user requests to access the context-based service, the service application A is activated.

When the service application A is activated, it generates a query Q[S, Cq] (step 1), indicating that the service application A, for correctly implementing the context-based service, needs to receive from the terminal T a set of context information S when a query condition Cq is fulfilled.

The query Q[S, Cq] is received by the context server SCtx, which preferably processes it (by means of its query pre-processor QPP and query processor QP, as it will be described in detail herein after) thus generating an update rule R[S, Cr] associated to the query Q (step 2) and indicating that the terminal T, for allowing the context server SCtx to correctly serve the query Q[S, Cq], should detect the context information S and transmit them to the context server SCtx when an update condition Cr is fulfilled.

According to this second embodiment, during step 2 the context server SCtx preferably also generates a trigger TR[S, Ct], indicating that the context server SCtx, for serving the query Q[S, Cq], should read from its context database C-DB the last update of the context information S and forward it to the service application A when a trigger condition Ct is fulfilled. The trigger condition Ct depends on the query condition Cq and on other parameters, as it will be discussed in detail herein after. The trigger TR[S, Ct] is then stored in the trigger database TR-DB.

The context server SCtx then transmits the update rule R[S, Cr] to the context client CCtx of the terminal T (step 3). Then, the context client CCtx preferably instructs the sensor module SM to operate according to the update rule R[S, Cr] (step 4). In this way, the sensor module SM starts to detect the context information S and to transmit their update to the context server SCtx when the update condition Cr is fulfilled. The context server SCtx then starts receiving updates of the context information S from the terminal T according to the update rule R[S, Cr] (step 5).

According to this second embodiment, each time the context server SCtx receives an update of the context information S, it preferably stores it in the context database C-DB (step 5a). Then, preferably, the context server SCtx checks in the trigger database TR-DB whether a trigger is active on the context information S (step 5b). As it will be discussed in further detail herein after, step 5a may be performed not in response to the reception of an update of the context information S, but at the expiration of the trigger clock CK, independently of the received updates, as it will be discussed in detail herein after.

If no trigger is active on the context information S, the context server SCtx preferably does not perform any other action, until the next update of the context information S is received (or until the trigger clock expires). Otherwise, the trigger processor TRP checks whether the trigger condition Ct is fulfilled (step 5c). In the affirmative, the context server SCtx preferably reads the context information S from the context database C-DB and forwards them to the service application A (step 6), which therefore can process them for providing the user of the terminal T with the context-based service. In the negative, the context server SCtx preferably does not perform any other action, until the next update of the context information S is received (or until the trigger clock CK expires).

Preferably, steps 5, 5a, 5b, 5c and 6 are repeated until the query Q[S, Cq] (and then the trigger TR[S, Ct] and the update rule R[S, Cr]) is expired.

Figure 5:
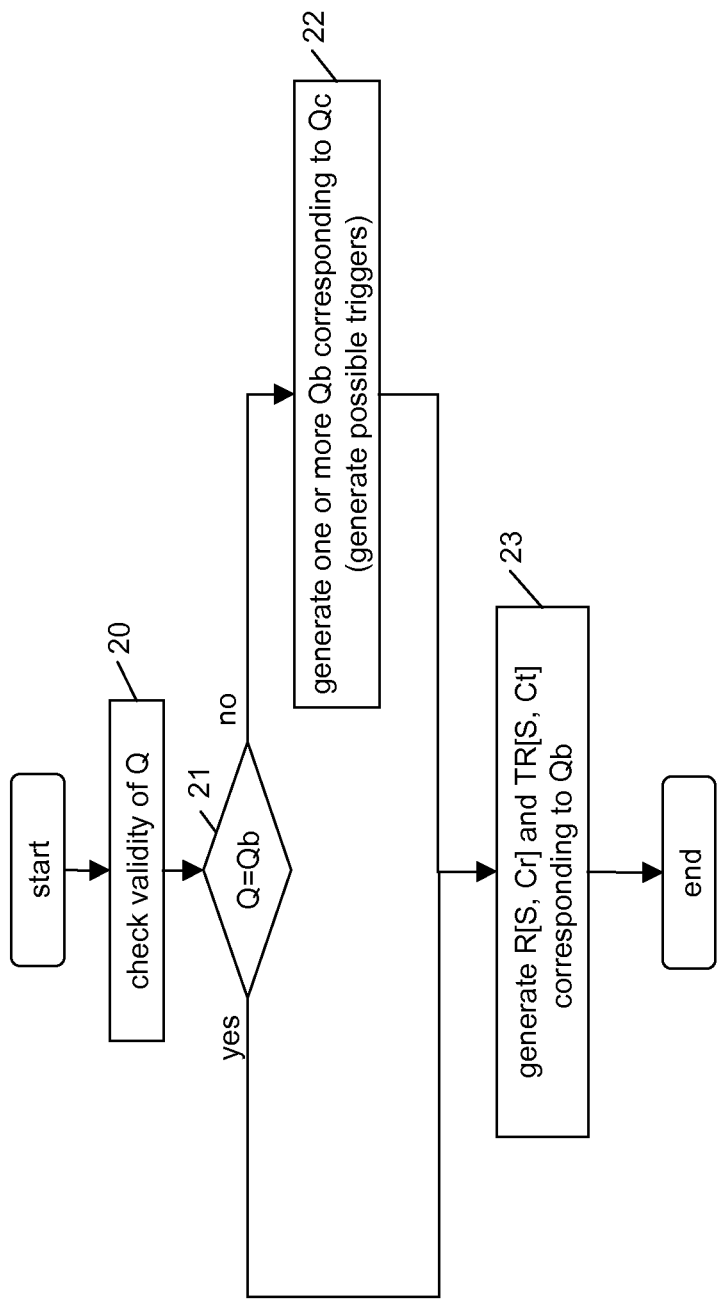
FIG. 5 is a flow chart showing is further detail the operation of the context server of FIG. 3.

The step 2 of generating a trigger TR[S, Ct] and an update rule R[S, Cr] associated to the query Q[S, Cq] will be now described in detail by referring to FIG. 5.

According to this second embodiment of the present invention, three different types of query conditions Cq are defined, i.e.:

on-clock query conditions, indicating that that the service application A, for correctly implementing the context-based service, needs to receive from the terminal T the context information S every x seconds. For simplicity, in the following description the on-clock query conditions will be indicated as Cq=C/x;

on-value query conditions, indicating that the service application A, for correctly implementing the context-based service, needs to receive from the terminal T the context information S when a condition on the value of a specific parameter p is fulfilled. The parameter p is preferably part of the context information S. For simplicity, in the following description the on-value query conditions will be indicated as Cq=V/(p=p*); and on-change query conditions, indicating that the service application A, for correctly implementing the context-based service, needs to receive from the terminal T the context information S when a parameter q changes its value. The parameter q is preferably part of the context information S. For simplicity, in the following description the on-change query conditions will be indicated as Cq=H/q. A particular on-change query condition preferably indicates that the service application A, for correctly implementing the context-based service, needs to receive from the terminal T the context information S when any of the context information S changes its value. For simplicity, in the following description this particular on-change query conditions will be indicated as Cq=H/.

Further, preferably, three different types of update conditions Cr are defined, which correspond to the above defined query conditions, i.e.: on-clock update conditions (Cr=C/x), on-value update conditions (Cr=V/(p=p*)) and on-change update conditions (Cr=H/q or Cr=H/). Similarly, three different types of trigger conditions Ct are defined, which correspond to the above defined query conditions, i.e.: on-clock trigger conditions (Ct=C/x), on-value trigger conditions (Cr=V/(p=p*)) and on-change trigger conditions (Ct=H/q or Ct=H/).

Further, according to embodiments of the present invention, a query generated by the service application A may comprise a single query condition or multiple query conditions linked by Boolean operators. Herein after, a query comprising a single query condition will be termed "basic query" and will be indicated as Qb, whereas a query comprising multiple query conditions linked by Boolean operators will be termed "complex query" and will be indicated as Qc. Since three types of query conditions have been defined above (on-clock, on-value and on-change), three different types of basic query Qb are preferably defined, i.e.:

basic query with on-clock query condition: Qb[S, C/x];
basic query with on-value query condition: Qb[S, V/(p=p*)]; and
basic query with on-change condition: Qb[S, H/q] or Qb=[S, H/].

Herein after, some examples of complex queries Qc are reported.

According to a first example, a complex query Qc may indicate that the service application A, for correctly implementing the context-based service, needs to receive from the terminal T the context information S when the parameter q changes value but, in case the parameter q is constant, the service application A anyway needs to monitor the context information S every x seconds. This complex query is then Qc[S, Cq1 OR Cq2], wherein Cq1=C/x and Cq2=H/q.

According to a second example, a complex query Qc may indicate that the service application A, for correctly implementing the context-based service, needs to receive from the terminal T the context information S when both the parameter q1 and the parameter q2 change their values. This complex query is then Qc[S, Cq1 AND Cq2], wherein Cq1=H/q1 and Cq2=H/q2.

By referring to FIG. 5, the context server SCtx receives a query Q by means of its query pre-processor QPP, which preferably validates the query Q (step 20). During validation, the query pre-processor QPP preferably checks whether the query Q has a correct syntax. Then, the query pre-processor QPP preferably checks whether the query Q is a basic query Qb (step 21).

If the query Q is a basic query Qb, the query pre-processor QPP preferably forwards the basic query Qb to the query processor QP, without performing any other processing.

On the other hand, if the query Q is a complex query Qc, the query pre-processor QPP preferably processes it for replacing the complex query Qc with one or more corresponding basic queries Qb and, possibly, one or more triggers (step 22).

For simplicity, by way of example, it is assumed that the complex query Qc comprises two query conditions Cq1 and Cq2 linked by a Boolean operator. Under this assumption, during step 22, the query pre-processor QPP preferably performs the following operations:

if the Boolean operator is equal to OR:
the pre-processor QPP preferably replaces the complex query Qc with a first basic query Qb1[S, Cq1] and a second basic query Qb2[S, Cq2], and forwards both the basic queries to the query processor QP, which processes them separately;

if the Boolean operator is equal to AND:
if Cq1=V/(p=p*) and Cq2=C/x:
the pre-processor QPP preferably replaces the complex query Qc with a basic query Qb[s, C/x] and a trigger TR[S, V/(p=p*)], forwards the basic query Qb[s, C/x] to the query processor QP and stores the trigger TR[S, V/(p=p*)] in the trigger database TR-DB;
if Cq1=V/(p=p*) and Cq2=H/q:
the pre-processor QPP preferably replaces the complex query Qc with a basic query Qb[s, H/q] and a trigger TR[S, V/(p=p*)], forwards the basic query Qb[s, H/q] to the query processor QP and stores the trigger TR[S, V/(p=p*)] in the trigger database TR-DB.

By referring again to FIG. 5, the query processor QP then receives from the query pre-processor QPP a basic query Qb (the particular case in which the query processor QP receives two basic queries Qb1 and Qb2 substantially at the same time will be discussed separately herein after).

Then, preferably, each basic query Qb is processed (step 23) for generating:

a corresponding trigger T[S, Ct] referring to the context information S and comprising a trigger condition Ct which, as mentioned above, may be an on-clock trigger condition, an on-value trigger condition or an on-change trigger condition; and
a corresponding update rule R[S, Cr] referring to the context information S and comprising an update condition Cr which, as mentioned above, may be an on-clock update condition, an on-value update condition or an on-change update condition.

Preferably, the trigger condition Ct is of the same type as the query condition comprised in the basic query Qb. Further, preferably, the update condition Cr may be either of the same type as the query condition comprised in the basic query Qb or of a different type, as it will be described in further detail herein after by referring to FIGS. 6a, 6b and 6c.

Figure 6A:
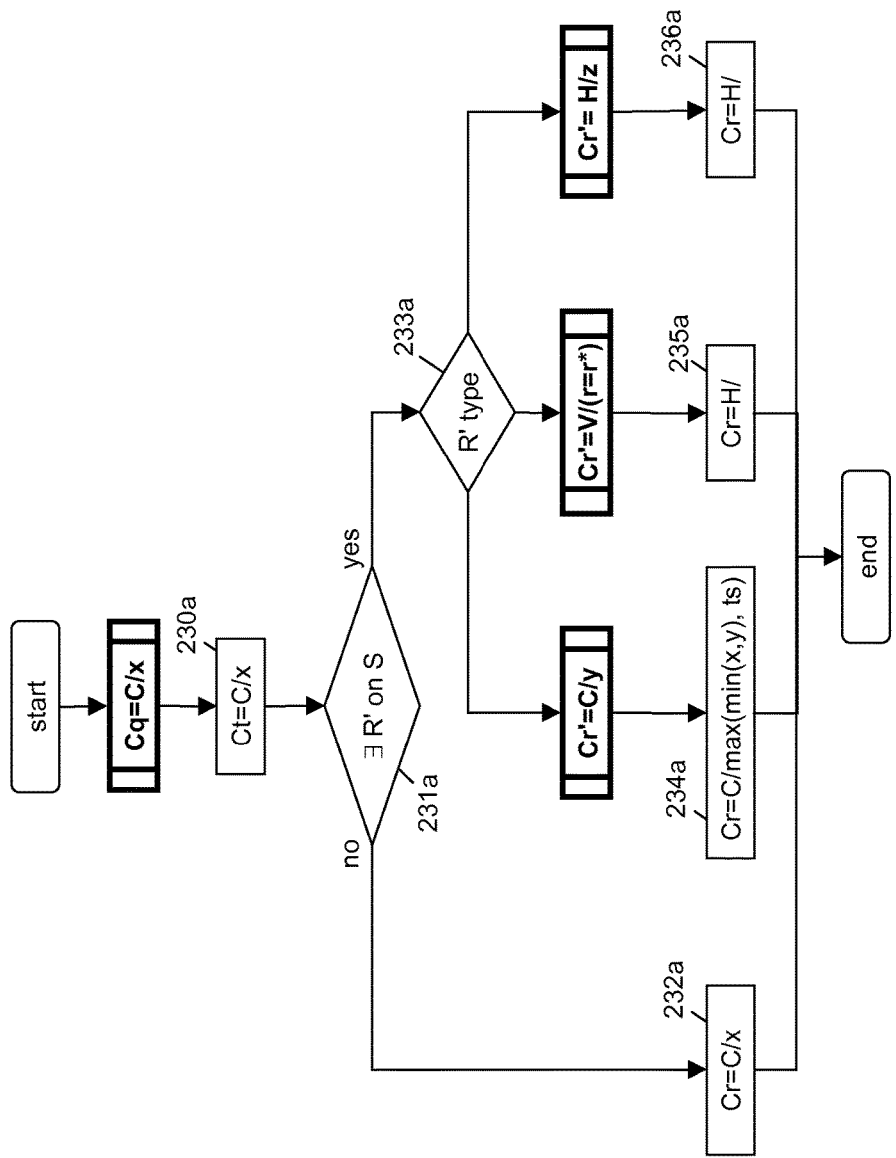
FIGS. 6a, 6b and 6c show in still further detail one of the steps of FIG. 5.
Figure 6B:
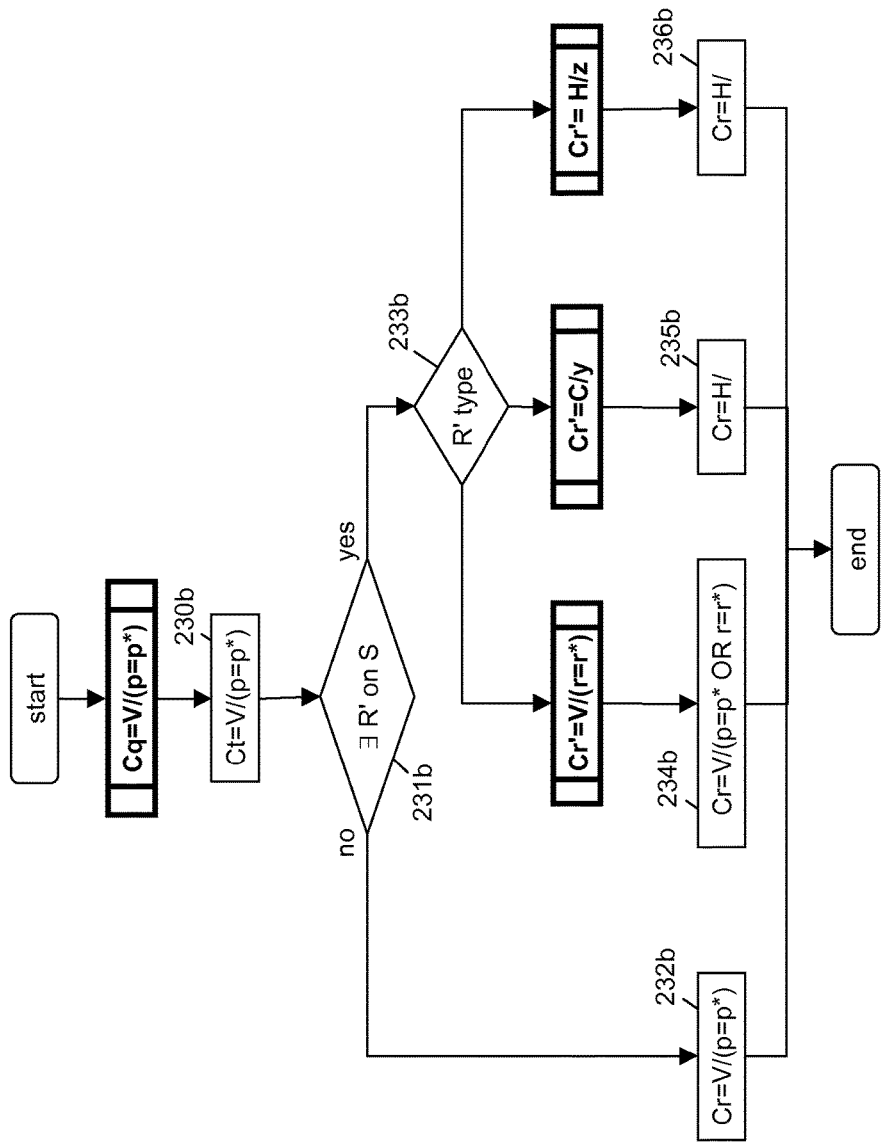
Figure 6C:
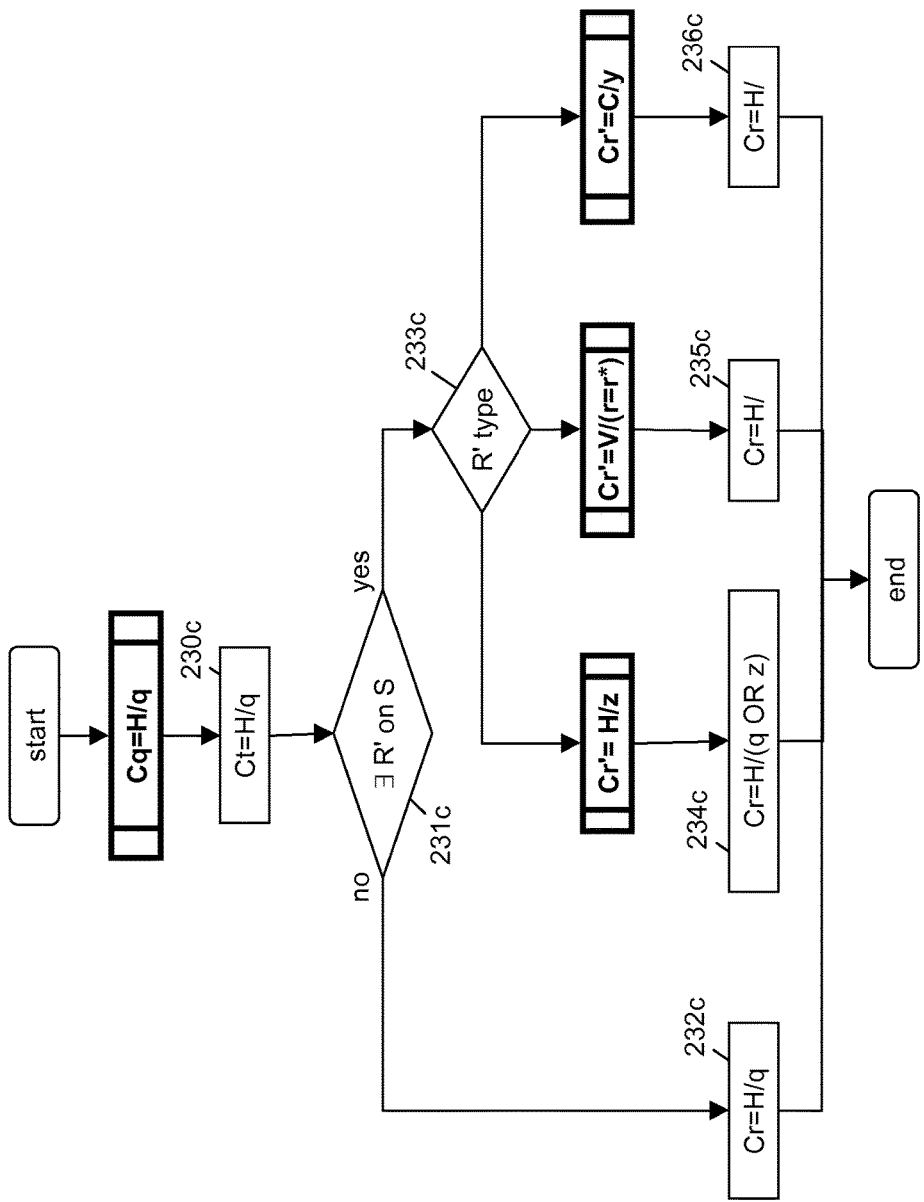

In particular, FIGS. 6a, 6b and 6c are flow charts relating to the operation of generating a trigger T[S, Ct] and an update rule R[S, Cr] corresponding to the basic query Qb, in case the basic query Qb comprises an on-clock query condition, an on-value query condition or an on-change query condition, respectively.

In particular, by firstly referring to FIG. 6a, if the basic query Qb comprises an on-clock query condition Cq=C/x, the query processor QP firstly generates a trigger with an on-clock trigger condition Ct=C/x (step 230a), and stores it in the trigger database TR-DB.

Then, the query processor QP preferably checks whether a further update rule R' relating to the context information S has already been generated for fulfilling a further query Q' which may have been generated either by the service application A itself or another service application cooperating with the context server SCtx (step 231a).

In the negative, the query processor QP preferably generates an update rule comprising an on-clock update condition Cr=C/x (step 232a).

In the affirmative, the query processor QP determines the type of update condition comprised in the already existing update rule R' (step 233a).

If the already existing update rule R' comprises an on-clock update condition Cr'=C/y (y being different from x), the query processor QP preferably replaces the update rule R' with an update rule comprising an on-clock update condition Cr=C/max(min(x,y), ts), wherein ts is the minimum context information detection and transmission period of the terminal T (step 234a). ts preferably depends on the clock of the context client CCtx and on the features of the sensor unit SM.

The update rule generated during step 234a is advantageously capable to serve both the basic query Qb and the previous query Q' associated to the update rule R'.

For instance, it is assumed that a first service application generates a first query Q' relating to the context information S and comprising a first on-clock query condition Cq'=C/y, with e.g. y=10 seconds. If no queries relating to the context information S are already active, the context processor QP preferably generates a first trigger TR' comprising a first on-clock trigger condition Ct'=C/10 (step 230a) and a first update rule R' comprising an on-clock update condition Cr'=C/10 (step 232a). The first trigger TR' is then stored at the trigger database TR-DB, while the first update rule R' is transmitted to the context client CCtx, which then instructs the sensor module SM to detect and transmit the context information S to the context server SCtx every 10 seconds. It is assumed that, while the first trigger TR' and the first update rule R' are still active, a second service application generates a second query Q relating to context information S and comprising a second on-clock query condition Cq=C/x, with e.g. x=5 seconds. The query processor QP then generates a second trigger TR comprising a second on-clock trigger condition Ct=C/5 (step 230a), which is stored at the trigger database TR-DB. Then, the query processor QP preferably performs step 231a (thus determining the existence of the first update rule R') and step 233a (thus determining that the first update rule R' comprises the on-clock update condition Cr'). Accordingly, the query processor QP preferably replaces the first update rule R' with a second update rule R comprising an on-clock update condition Cr=C/max(min(10.5), ts)=C/5 (step 234a), assuming that is lower than 5 seconds. The second update rule R is transmitted to the context client CCtx, thus replacing the first update rule R'. The context client CCtx then instructs the sensor module SM to detect and transmit the context information S to the context server SCtx every 5 seconds. While the context server CStx is receiving the updates of the context information S according to the second update rule R, the trigger processor TRP preferably cooperates with the trigger clock CK for checking whether the on-clock trigger conditions Ct' and Ct are fulfilled. Therefore, the updates on the context information S are read from the context database C-DB and sent to the first service application each time the first trigger condition Ct' is fulfilled, i.e. every 10 seconds. On the other hand, the updates on the context information S are read from the context database C-DB and sent to the second service application each time the second trigger condition Ct is fulfilled, i.e. every 5 seconds.

Referring again to FIG. 6a, if during step 233a the query processor QP determines that the already existing update rule R' comprises an on-value update condition Cr'=V/(r=r*), the query processor QP preferably replaces the already existing update rule R' with an update rule comprising an on-change update condition Cr=H/ (step 235a).

Also in this case, the update rule generated during step 235a is advantageously capable to serve both the basic query Qb and the previous query Q' associated to the update rule R'.

For instance, it is assumed that a first service application generates a first query Q' relating to the context information S and comprising an on-value query condition Cq'=V/(r=r*). If no queries relating to the context information S are already active, the context processor QP preferably generates a first trigger TR' comprising an on-value trigger condition Ct'=V/(r=r*) (step 230b, which will be described in detail herein after by referring to FIG. 6b) and a first update rule R' comprising an on-value update condition Cr'=V/(r=r*) (step 232b, which will be described in detail herein after by referring to FIG. 6b). The first trigger TR' is then stored at the trigger database TR-DB, while the first update rule R' is transmitted to the context client CCtx, which then instructs the sensor module SM to detect and transmit the context information S to the context server SCtx when r is equal to r*. It is assumed that, while the first trigger TR' and the first update rule R' are still active, a second service application generates a second query Q relating to the context information S and comprising an on-clock query condition Cq=C/x, with e.g. x=5 seconds. The query processor QP then generates a second trigger TR comprising an on-clock trigger condition Ct=C/5 (step 230a), which is stored at the trigger database TR-DB. Then, the query processor QP preferably performs step 231a (thus determining the existence of the first update rule R') and step 233a (thus determining that the first update rule R' comprises the on-value update condition Cr'). Accordingly, the query processor QP preferably replaces the first update rule R' with a second update rule R comprising an on-change update condition Cr=H/ (step 235a). The second update rule R is transmitted to the context client CCtx, thus replacing the first update rule R'. The context client CCtx then instructs the sensor module SM to detect and transmit the context information S to the context server SCtx each time any of the context information S changes value. Upon reception of each update of the context information S, the trigger processor TRP stores the updated context information S in the context database C-DB and preferably checks whether the on-value trigger condition Ct' is fulfilled and, in the affirmative, it reads the context information S from the context database C-DB and forwards it to the first service application. Besides, upon reception of each update of the context information S, the trigger processor TRP cooperates with the trigger clock CK for checking whether the on-clock trigger condition Ct is fulfilled and, in the affirmative, it reads the context information S from the context database C-DB and forwards it to the second service application.

Referring again to FIG. 6a, if during step 233a the query processor QP determines that the already existing update rule R' comprises an on-change update condition Cr'=H/z, the query processor QP preferably replaces the already existing update rule R' with an update rule comprising an on-change update condition Cr=H/ (step 236a).

Also in this case, the update rule generated during step 236a is advantageously capable to serve both the basic query Qb and the previous query Q' associated to the update rule R'.

For instance, it is assumed that a first service application generates a first query Q' relating to the context information S and comprising an on-change query condition Cq'=H/z. If no queries relating to the context information S are already active, the context processor QP preferably generates a first trigger TR' comprising an on-change trigger condition Ct'=H/z (step 230c, which will be described in detail herein after by referring to FIG. 6c) and a first update rule R' comprising an on-change update condition Cr'=H/z (step 232c, which will be described in detail herein after by referring to FIG. 6c). The first trigger TR' is then stored at the trigger database TR-DB, while the first update rule R' is transmitted to the context client CCtx, which then instructs the sensor module SM to detect and transmit the context information S to the context server SCtx when z changes value. It is assumed that, while the first trigger TR' and the first update rule R' are still active, a second service application generates a second query Q relating to the context information S and comprising an on-clock query condition Cq=C/x, with e.g. x=5 seconds. The query processor QP then generates a second trigger TR comprising an on-clock trigger condition Ct=C/5 (step 230a), which is stored at the trigger database TR-DB. Then, the query processor QP preferably performs step 231a (thus determining the existence of the first update rule R') and step 233a (thus determining that the first update rule R' comprises an on-change update condition Cr'). Accordingly, the query processor QP preferably replaces the first update rule R' with a second update rule R comprising an on-change update condition Cr=H/ (step 236a). The second update rule R is transmitted to the context client CCtx, thus replacing the first update rule R'. The context client CCtx then instructs the sensor module SM to detect and transmit the context information S to the context server SCtx each time any of the context information S changes value. Upon reception of each update of the context information S, the trigger processor TRP checks whether the on-change trigger condition Ct' is fulfilled and, in the affirmative, it reads the context information S from the context database C-DB and forwards it to the first service application. Besides, upon reception of each update of the context information S, the trigger processor TRP cooperates with the trigger clock CK for checking whether the on-clock trigger condition Ct is fulfilled and, in the affirmative, it reads the context information S from the context database C-DB and forwards it to the second service application.

By referring now to FIG. 6b, if the basic query Qb comprises an on-value query condition Cq=V/(p=p*), the query processor QP firstly generates a trigger with an on-value trigger condition Ct=V/(p=p*) (step 230b), and stores it in the trigger database TR-DB.

Then, the query processor QP preferably checks whether a further update rule R' relating to the context information S has already been generated for fulfilling a further query Q' which may have been generated either by the service application A itself or another service application cooperating with the context server SCtx (step 231b).

In the negative, the query processor QP preferably generates an update rule comprising an on-value update condition Cr=V/(p=p*) (step 232b).

In the affirmative, the query processor QP determines the type of update condition comprised in the already existing update rule R' (step 233b).

If the already existing update rule R' comprises an on-value update condition Cr'=V/(r=r*) (the parameter r being other than the parameter p), the query processor QP preferably replaces the already existing update rule R' with an update rule comprising an on-value update condition Cr=V/(p=p* OR r=r*) (step 234b).

The update rule generated during step 234b is advantageously capable to serve both the basic query Qb and the previous query Q' associated to the update rule R'.

For instance, it is assumed that a first service application generates a first query Q' relating to the context information S and comprising a first on-value query condition Cq'=V/(r=r*). If no queries relating to the context information S are already active, the context processor QP preferably generates a first trigger TR' comprising a first on-value trigger condition Ct'=V/(r=r*) (step 230b) and a first update rule R' comprising an on-value update condition Cr'=V/(r=r*) (step 232b). The first trigger TR' is then stored at the trigger database TR-DB, while the first update rule R' is transmitted to the context client CCtx, which then instructs the sensor module SM to detect and transmit the context information S to the context server SCtx when r is equal to r*. It is assumed that, while the first trigger TR' and the first update rule R' are still active, a second service application generates a second query Q relating to the context information S and comprising a second on-value query condition Cq=V/(p=p*), with p other than r. The query processor QP then generates a second trigger TR comprising a second on-value trigger condition Ct=V/(p=p*) (step 230b), which is stored at the trigger database TR-DB. Then, the query processor QP preferably performs step 231b (thus determining the existence of the first update rule R') and step 233b (thus determining that the first update rule R' comprises the on-value update condition Cr). Accordingly, the query processor QP preferably replaces the first update rule R' with a second update rule R comprising an on-value update condition Cr=V(p=p* OR r=r*) (step 234b). The second update rule R is transmitted to the context client CCtx, thus replacing the first update rule R'. The context client CCtx then instructs the sensor module SM to detect and transmit the context information S to the context server SCtx each time p is equal to p* and each time r is equal to r*. Upon reception of each update of the context information S, the trigger processor TRP preferably checks whether the on-value trigger conditions Ct' and Ct are fulfilled. When the first on-value trigger condition Ct' is fulfilled, the context information S are read from the context database C-DB and sent to the first service application. When the second on-value trigger condition Ct is fulfilled, the context information S are read from the context database C-DB and sent to the second service application.

Referring again to FIG. 6b, if during step 233b the query processor QP determines that the already existing update rule R' comprises an on-clock update condition Cr'=C/y, the query processor QP preferably replaces the already existing update rule R' with an update rule comprising an on-change update condition Cr=H/(step 235b).

Also in this case, the update rule generated during step 235b is advantageously capable to serve both the basic query Qb and the previous query Q' associated to the update rule R'. This situation is substantially the same the one described above by referring to FIG. 6a, in case the already existing update rule R' comprises an on-value update condition. Accordingly, a detailed description will not be repeated.

By referring again to FIG. 6b, if during step 233b the query processor QP determines that the already existing update rule R' comprises an on-change update condition Cr'=H/z, the query processor QP preferably replaces the already existing update rule R' with an update rule comprising an on-change update condition Cr=H/ (step 236b).

Also in this case, the update rule generated during step 236b is advantageously capable to serve both the basic query Qb and the previous query Q' associated to the update rule R'.

For instance, it is assumed that a first service application generates a first query Q' relating to the context information S and comprising an on-change query condition Cq'=H/z. If no queries relating to the context information S are already active, the context processor QP preferably generates a first trigger TR' comprising an on-change trigger condition Ct'=H/z (step 230c, which will be described in detail herein after by referring to FIG. 6c) and a first update rule R' comprising an on-change update condition Cr'=H/z (step 232c, which will be described in detail herein after by referring to FIG. 6c). The first trigger TR' is then stored at the trigger database TR-DB, while the first update rule R' is transmitted to the context client CCtx, which then instructs the sensor module SM to detect and transmit the context information S to the context server SCtx when z changes value. It is assumed that, while the first trigger TR' and the first update rule R' are still active, a second service application generates a second query Q relating to the context information S and comprising an on-value query condition Cq=V/(p=p*). The query processor QP then generates a second trigger TR comprising an on-value trigger condition Ct=V/(p=p*) (step 230b), which is stored at the trigger database TR-DB. Then, the query processor QP preferably performs step 231b (thus determining the existence of the first update rule R') and step 233b (thus determining that the first update rule R' comprises the on-change update condition Cr). Accordingly, the query processor QP preferably replaces the first update rule R' with a second update rule R comprising an on-change update condition Cr=H/ (step 236b). The second update rule R is transmitted to the context client CCtx, thus replacing the first update rule R'. The context client CCtx then instructs the sensor module SM to detect and transmit the context information S to the context server SCtx each time any of the context information S changes value. Upon reception of each update of the context information S, the trigger processor TRP preferably checks whether the on-change trigger condition Ct' is fulfilled and, in the affirmative, the context information S are read from the context database C-DB and sent to the first service application. Besides, upon reception of each update of the context information S, the trigger processor TRP also preferably checks whether the on-value trigger condition Ct is fulfilled and, in the affirmative, the context information S are read from the context database C-DB and sent to the second service application.

By referring now to FIG. 6c, if the basic query Qb comprises an on-change query condition Cq=H/q, the query processor QP firstly generates a trigger with an on-change trigger condition Ct=H/q (step 230c), and stores it in the trigger database TR-DB.

Then, the query processor QP preferably checks whether a further update rule R' relating to the context information S has already been generated for fulfilling a further query Q' which may have been generated either by the service application A itself or another service application cooperating with the context server SCtx (step 231c).

In the negative, the query processor generates an update rule comprising an on-change update condition Cr=H/q (step 232c).

In the affirmative, the query processor QP determines the type of update condition comprised in the already existing update rule R' (step 233c).

If the already existing update rule R' comprises an on-change update condition Cr'=H/z (the parameter z being other than the parameter q), the query processor QP preferably replaces the already existing update rule R' with an update rule comprising an on-change update condition Cr=H/(q OR z) (step 234c).

The update rule generated during step 234c is advantageously capable to serve both the basic query Qb and the previous query Q' associated to the update rule R'

For instance, it is assumed that a first service application generates a first query Q' relating to the context information S and comprising an on-change query condition Cq'=H/z. If no queries relating to the context information S are already active, the context processor QP preferably generates a first trigger TR' comprising a first on-change trigger condition Ct'=H/z (step 230c) and a first update rule R' comprising an on-change update condition Cr'=H/z (step 232c). The first trigger TR' is then stored at the trigger database TR-DB, while the first update rule R' is transmitted to the context client CCtx, which then instructs the sensor module SM to detect and transmit the context information S to the context server SCtx when z changes value. It is assumed that, while the first trigger TR' and the first update rule R' are still active, a second service application generates a second query Q relating to the context information S and comprising a second on-change query condition Cq=H/q, with q other than z. The query processor QP then generates a second trigger TR comprising a second on-change trigger condition Ct=H/q (step 230c), which is stored at the trigger database TR-DB. Then, the query processor QP preferably performs step 231c (thus determining the existence of the first update rule R') and step 233c (thus determining that the first update rule R' comprises the on-change update condition Cr'). Accordingly, the query processor QP preferably replaces the first update rule R' with a second update rule R comprising an on-change update condition Cr=H/(q OR z) (step 234c). The second update rule R is transmitted to the context client CCtx, thus replacing the first update rule R'. The context client CCtx then instructs the sensor module SM to detect and transmit the context information S to the context server SCtx each time either q or z changes value. Upon reception of each update of the context information S, the trigger processor TRP preferably checks whether the on-value trigger conditions Ct' and Ct are fulfilled. If the first on-change trigger condition Ct' is fulfilled, the context information S are read from the context database C-DB and sent to the first service application. If the second on-change trigger condition Ct is fulfilled, the context information S are read from the context database C-DB and sent to the second service application.

By referring again to FIG. 6c, if during step 233c the query processor QP determines that the already existing update rule R' comprises an on-value update condition Cr'=V/(r−r*), the query processor QP preferably replaces the already existing update rule R' with an update rule comprising an on-change update condition Cr=H/ (step 235c).

Also in this case, the update rule generated during step 235c is advantageously capable to serve both the basic query Qb and the previous query Q' associated to the update rule R, as disclosed above by referring to FIG. 6b, in case the already existing update rule R' comprises an on-change condition (step 236b).

By referring again to FIG. 6c, if during step 233c the query processor QP determines that the already existing update rule R' comprises an on-clock update condition Cr'=C/y, the query processor QP preferably replaces the already existing update rule R' with an update rule comprising an on-change update condition Cr=H/(step 236c).

Also in this case, the update rule generated during step 236c is advantageously capable to serve both the basic query Qb and the previous query Q' associated to the update rule R', as disclosed above by referring to FIG. 6a, in case the already existing update rule R' comprises an on-change condition (step 236a).

Therefore, according to this second embodiment of the invention, the resources of the terminal T are used in a still improved way. Indeed, thanks to the triggers, two or more different queries generated by different service applications and relating to the same context information can be "merged" in a single update rule, which is capable to serve both queries. Indeed, from the above flow charts, it can be noticed that when two queries relating to the same context information are received at the context server SCtx, the context server SCtx determines a single update condition which is suitable for fulfilling at the same time all the queries, while it associates to each basic query a separate trigger including a trigger condition equal to the query condition. Therefore, while the transmission of the updates from the terminal T to the context server SCtx is regulated by the "common" update rule, the forwarding of the updates from the context server SCtx to the service applications is regulated by the trigger conditions.

Advantageously, the above mechanism of "merging" different queries in a single update rule advantageously allows to optimise the resources of the terminal T. Indeed, instead of separately serving the two queries, the terminal T operating according to the update rule determined as disclosed above advantageously detects and transmits the minimum amount of updates of the context information S which is sufficient for serving both queries at the same time.

Further, as mentioned above, also complex queries may be managed in a very efficient way. In particular, the above mentioned complex queries Qc including two query conditions Cq1 and Cq2 related by an OR Boolean operator are replaced by the query pre-processor QPP with a first and second basic queries Qb1 and Qb2, which are then sent to the query processor QP. Preferably, the query processor QP processes the two basic queries Qb1 and Qb2 by firstly processing the first basic query Qb1 as shown in the flow charts of FIGS. 6a, 6b and 6c, and then by separately processing the second basic query Qb2 as shown in the flow charts of FIGS. 6a, 6b and 6c, and by transmitting the resulting update rule to the context client CCtx only after the processing of the second basic query Qb2 is completed. In this way, the resulting update rule takes into account both the basic queries Qb1 and Qb2.

Further, according to advantageous embodiments of the present invention, each query Q is associated to an expiration time. In particular, the query processor QP preferably cooperates with an active query table (not shown in the drawings) which stores, for each query received at the context server SCtx, the query expiration time. The query processor QP periodically checks the active query table for possible expired queries, by comparing the trigger clock CK with the expiration times stored in the table. Upon expiration of the expiration time of a query, the query processor QP preferably recalculates the update rule relating to the context information S concerned by the expired query. In particular, the query processor recalculates the update rule as if the still active queries relating to the context information S were arrived at the context information SCtx after expiration of the expired query. Further, the query processor QP also deletes from the trigger database TR-DB possible triggers associated to the expired query.

Further, preferably, according to advantageous embodiments of the present invention the trigger processor TRP cooperates with an active trigger table (not shown in the drawings). The active trigger table preferably comprises a list of the active triggers. For each active trigger, the active trigger table preferably indicates the query according to which the trigger has been generated, the trigger condition to be fulfilled, the context information requested by the service application and the terminal to which the trigger condition refers and an identifier (preferably, an URL) of the service application to which the context information has to be forwarded when the trigger condition is fulfilled. In order to check the on-clock trigger conditions, the trigger processor TRP preferably cooperates with the trigger clock CK.

Further, according to advantageous embodiments, the context information S stored at the context database C-DB are associated to an expiration time. When the expiration time of the context information is expired, the stored values of the context information S will be no more considered valid. The expiration time of the context information S is preferably determined by the context client CCtx, depending on the update rule according to which the context information S is being detected and transmitted to the context server SCtx. For instance:

- if the update rule R[S, Cr] comprises an on-clock update condition Cr=C/x, the context client CCtx preferably sets the expiration time of the context information S equal to (5/4)x. This advantageously ensures that the values of the context information S are considered valid until the next update arrives at the context database C-DB;
- if the update rule R[S, Cr] comprises an on-value update condition Cr=V/(p=p*) or an on-change update condition Cr=H/q, the context client CCtx preferably sets the expiration time of the context information S equal to infinity, since the values of the context information S have to be valid until the next update arrives at the context database C-DB, which is an unpredictable event.

The invention claimed is:

1. A method for providing a context-based service to a mobile terminal of a user of a communication network, comprising:
    a) at a context server cooperating with said communication network, receiving a query generated from a service application cooperating with said context server for implementing said context-based service, said query indicating that said service application needs to receive from said context server a set of context information when an event associated with a query condition occurs;
    b) at said context server, generating an update rule in response to receiving said query from said service application, said update rule indicating that said mobile terminal, for allowing said context server to serve said query, has to transmit said context information to said context server when an update condition is fulfilled, said update condition being temporally dependent on said query condition, wherein b) further comprises checking whether a further update rule comprising a further update condition and relating to said context information is active and, in the negative, inserting in said update rule, an update condition of an update condition type corresponding to a query condition type;
    c) transmitting said update rule from said context server to said mobile terminal;
    d) receiving said context information from said mobile terminal when said update condition is fulfilled; and e) at said context server, forwarding said context information to said service application, thereby allowing said service application to implement said context-based service.

2. The method according to claim 1, wherein b) further comprises generating a trigger associated with said query, said trigger indicating that said context server, for serving said query, has to forward said context information to said service application when a trigger condition is fulfilled.

3. The method according to claim 1, wherein said update condition type corresponds to said query condition type.

4. The method according to claim 2, wherein a) comprises determining a query condition type, said query condition type being one of: on-clock query condition type, on-value query condition type and on-change query condition type.

5. The method according to claim 4, wherein b) comprises inserting in said trigger, a trigger condition of a trigger condition type corresponding to said query condition type.

6. The method according to claim 4, wherein, when said further update rule is active, if said query condition type is said on-clock query condition type:
- if said further update condition is of on-clock type, inserting in said update rule, a first update condition and transmission of said context information at said mobile terminal;
- if said further update condition is of on-value type or of on-change type, inserting in said update rule a second update condition, and
- replacing said further update rule with said update rule.

7. The method according to claim 4, wherein, when said further update rule is active, if said query condition type is said on-value query condition type:
- if said further update condition is of on-value type, inserting in said update rule a first update condition;
- if said further update condition is of on-clock type or of on-change type, inserting in said update rule a second update condition; and
- replacing said further update rule with said update rule.

8. The method according to claim 4, wherein, when said further update rule is active, if said query condition type is said on-change query condition type:
- if said further update condition is of on-change type, inserting in said update rule a first update condition;
- if said further update condition is of on-value type or of on-clock type, inserting in said update rule a second update condition; and
- replacing said further update rule with said update rule.

9. A context server capable of cooperating with a communication network for providing a context-based service to a mobile terminal of a user of said communication network, said context server comprising:
- a memory; and
- at least one processor coupled to the memory and configured to:
  - receive a query from a service application cooperating with said context server for implementing said context-based service, said query indicating that said service application needs to receive from said context server a set of context information relating to said mobile terminal when an event associated with a query condition occurs;
  - generate an update rule in response to receiving said query from said service application, said update rule indicating that said mobile terminal for allowing said context server to serve said query, has to detect said context information and transmit said context information to said context server when an update condition is fulfilled, said update condition being temporally dependent on said query condition, and wherein generating the update rule further comprises checking whether a further update rule comprising a further update condition and relating to said context information is active and, in the negative, inserting in said update rule, an update condition of an update condition type corresponding to a query condition type;
  - transmit said update rule to said mobile terminal;
  - receive said context information from said mobile terminal when said update condition is fulfilled; and
  - forward said context information to said service application.

10. The context server according to claim 9, wherein said at least one processor is further configured to generate a trigger associated with said query, said trigger indicating that said context server, for serving said query, has to forward said context information to said service application when a trigger condition is fulfilled, said context server further comprising a trigger database for storing said trigger.

11. The context server according to claim 10, wherein said at least one processor is further configured to:
- check whether said trigger condition is fulfilled; and
- forward said context information to said service application if said trigger condition is fulfilled.

12. The context server according to claim 9, wherein said at least one processor is further configured to determine a query condition type, said query condition type selected from the group consisting of an on-clock query condition type, an on-value query condition type, and an on-change query condition type.

13. A mobile terminal for a communication network, comprising a communication network cooperating with a context server configured to provide a context-based service to said mobile terminal, said mobile terminal comprising at least one sensor configured to detect context information relating to said mobile terminal, said mobile terminal being configured to:
- receive from said context server an update rule indicating that said mobile terminal, for allowing said context server to serve a query, has to detect said context information and transmit said context information to said context server when an update condition is fulfilled, said update condition being temporally dependent on a query condition associated with said query; and
- operate said at least one sensor according to said update rule,
- wherein said context server comprises the context server according to claim 9.

14. A communication system, comprising:
- a communication network;
- a service application configured to implement a context-based service;
- a context server configured to cooperate with said service application and with said communication network; and
- a mobile terminal comprising a network interface and at least one sensor configured to detect context information relating to said mobile terminal, said mobile terminal being configured to:
  - receive, from said context server and via said network interface, an update rule indicating that said mobile terminal, for allowing said context server to serve a query, has to detect said context information and transmit said context information to said context server when an update condition is fulfilled; and operate said at least one sensor according to said update rule, said context server comprising the context server according to claim 9.

* * * * *